US008250082B2

(12) United States Patent
Gwozdz et al.

(10) Patent No.: US 8,250,082 B2
(45) Date of Patent: Aug. 21, 2012

(54) CROSS DOMAIN COMMUNICATION

(75) Inventors: Daniel Gwozdz, Fall City, WA (US); Scott M Isaacs, Sammamish, WA (US); Reid Maker, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 11/426,174

(22) Filed: Jun. 23, 2006

(65) Prior Publication Data
US 2007/0299857 A1 Dec. 27, 2007

(51) Int. Cl.
*G06F 7/00* (2006.01)
(52) U.S. Cl. ......... 707/756; 707/755; 707/792; 707/800
(58) Field of Classification Search .................... None
See application file for complete search history.

(56) References Cited

U.S. PATENT DOCUMENTS

| | | | |
|---|---|---|---|
| 4,227,253 A | 10/1980 | Ehrsam et al. | |
| 5,210,874 A * | 5/1993 | Karger | 719/328 |
| 5,339,422 A | 8/1994 | Brender et al. | |
| 5,377,188 A * | 12/1994 | Seki | 370/390 |
| 5,666,519 A | 9/1997 | Hayden | |
| 6,275,938 B1 | 8/2001 | Bond et al. | |
| 6,801,224 B1 * | 10/2004 | Lewallen | 715/746 |
| 6,934,757 B1 | 8/2005 | Kalantar et al. | |
| 7,318,238 B2 | 1/2008 | Elvanoglu et al. | |
| 7,328,435 B2 * | 2/2008 | Trifon | 717/171 |
| 2003/0002526 A1 * | 1/2003 | Dias et al. | 370/466 |
| 2003/0023880 A1 | 1/2003 | Edwards et al. | |
| 2003/0093666 A1 | 5/2003 | Millen et al. | |
| 2003/0135504 A1 * | 7/2003 | Elvanoglu et al. | 707/100 |
| 2003/0177226 A1 * | 9/2003 | Garg et al. | 709/224 |
| 2004/0210536 A1 * | 10/2004 | Gudelj et al. | 705/64 |
| 2004/0215731 A1 * | 10/2004 | Tzann-en Szeto | 709/207 |
| 2004/0254812 A1 * | 12/2004 | Horstemeyer | 705/1 |
| 2004/0268139 A1 | 12/2004 | Christian et al. | |
| 2005/0055458 A1 * | 3/2005 | Mohan et al. | 709/238 |
| 2005/0204041 A1 * | 9/2005 | Blinn et al. | 709/225 |
| 2005/0216582 A1 | 9/2005 | Toomey et al. | |
| 2005/0223412 A1 | 10/2005 | Nadalin et al. | |

(Continued)

FOREIGN PATENT DOCUMENTS
EP 1420562 A2 5/2004

OTHER PUBLICATIONS

Scott et al., Design Considerations for Cross Page Post Backs in ASP.NET 2.0, Jul. 24, 2005, http://odetocode.com/Articles/421.aspx, pp. 1-9.*

(Continued)

*Primary Examiner* — Pierre Vital
*Assistant Examiner* — Mohammad S Rostami
(74) *Attorney, Agent, or Firm* — Lee & Hayes, PLLC

(57) ABSTRACT

Various embodiments utilize nested Iframes within a web page to allow cross domain communication. That is, various embodiments can create an embedded Iframe that shares the domain of an Iframe or web page with which communication is desired. Because the embedded Iframe shares the domain of the Iframe or web page with which communication is desired, restrictions on cross-site scripting do not inhibit communication or scripting between the domain-matched Iframe(s) and/or web page. This embedded Iframe can then provide a mechanism by which web pages or Iframes from other domains can communicate with the Iframe or web page with which the embedded Iframe shares a domain.

15 Claims, 7 Drawing Sheets

U.S. PATENT DOCUMENTS

| | | | | |
|---|---|---|---|---|
| 2005/0256924 | A1* | 11/2005 | Chory et al. | 709/203 |
| 2005/0259655 | A1 | 11/2005 | Cuervo et al. | |
| 2005/0259674 | A1* | 11/2005 | Cuervo et al. | 370/422 |
| 2005/0262232 | A1 | 11/2005 | Cuervo et al. | |
| 2005/0267870 | A1* | 12/2005 | Everett-Church et al. | 707/3 |
| 2006/0010134 | A1* | 1/2006 | Davis et al. | 707/10 |
| 2006/0053048 | A1* | 3/2006 | Tandetnik | 705/14 |
| 2006/0053224 | A1 | 3/2006 | Subramaniam | |
| 2006/0069737 | A1* | 3/2006 | Gilhuly et al. | 709/207 |
| 2006/0136590 | A1* | 6/2006 | Barrett et al. | 709/225 |
| 2006/0143688 | A1 | 6/2006 | Futoransky et al. | |
| 2006/0185021 | A1 | 8/2006 | Dujari et al. | |
| 2006/0277218 | A1 | 12/2006 | Franco et al. | |
| 2007/0016949 | A1 | 1/2007 | Dunagan et al. | |
| 2007/0050854 | A1 | 3/2007 | Cooperstein et al. | |
| 2007/0101258 | A1* | 5/2007 | Xu et al. | 715/516 |
| 2007/0124693 | A1* | 5/2007 | Dominowska et al. | 715/772 |
| 2007/0260495 | A1* | 11/2007 | Mace et al. | 705/5 |
| 2007/0261037 | A1* | 11/2007 | Bendapudi | 717/136 |
| 2007/0299857 | A1 | 12/2007 | Gwozdz et al. | |
| 2007/0300064 | A1 | 12/2007 | Isaacs et al. | |
| 2008/0313648 | A1 | 12/2008 | Wang et al. | |
| 2009/0183171 | A1 | 7/2009 | Isaacs et al. | |
| 2009/0183227 | A1 | 7/2009 | Isaacs et al. | |
| 2009/0187918 | A1 | 7/2009 | Chen et al. | |
| 2009/0299862 | A1 | 12/2009 | Fan et al. | |
| 2009/0300496 | A1 | 12/2009 | Fan et al. | |
| 2009/0327869 | A1 | 12/2009 | Fan et al. | |
| 2010/0058293 | A1 | 3/2010 | Dunagan et al. | |

OTHER PUBLICATIONS

Bershad et al., "Lightweight Remote Procedure Call", ACM Transactions on Computer Systems, vol. 8, No. 1, Feb. 1990, pp. 37-55.

Gong et al., "Going beyond the Sandbox: An Overview of the New Security Architecture in the Java Development Kit 1.2", Proceedings of the USENIX Symposium on Internet Technologies and Systems, Dec. 1997, 10 pages.

Jose et al., Integrated Context Management for Multi-domain Pervasive Environments, Information Systems Department, 10 pages.

Karger et al., "Haystack: A user interface for creating, browsing, and organizing arbitrary semistructured information", CHI, Apr. 24-29, 2004, Vienna, Austria, pp. 777-778.

Zhang et al., "An agent-based framework for cross-domain cooperation of enterprise", Computer Supported Cooperative Work in Design, 2004, http://ieeexplore.ieee.org/xpl/abs_free.jsp?arNumber=1349034, printed on Apr. 13, 2006, 1 page.

Dhamija, et al., "The Battle against Phishing: Dynamic Security Skins", retrived on Jul. 6-8, 2005 at <<http/www.cs.berkeley.edu/~tygar/papers/Phishing/Battle_against_phishing.pdf>>, ACM, 2005, pp. 77-88.

Jose, et al., "Integrated Context Management for Multi-domain Pervasive Environments", at <<http:/repositorium.sdum.uminho.pt/bitstream/1822/2878/1/2005-MCMP-vade-context_final.pdf>>, Portugal, pp. 10.

Kals, et al., "SecuBat: A Web Vulnerability Scanner", retrieved on May 23-26, 2006 at <<http://www.seclab.tuwien.ac.at/papers/secubat.pdf>>, ACM, WWW 2006, pp. 10.

Lopes, et al. "A Uniform Resource Identifier Scheme for SNMP" 2002 IEEE 6 pages.

Paternostro, et al. "Advanced Features of the Eclipse Modeling Framework" tutorial, http://eclipse.org/emf/docs/presentations/EclipseCon/ Mar. 20, 2006, 106 pages.

Ray, et al. Programming Web Services with Perl, by: Randy J. Ray; Pavel Kulchenko, Publisher: O'Reilly Media, Inc. Pub. Date: Dec. 19, 2002, Chapter 11 REST: Representational State Transfer, pp. 237-261.

RFC 3986—Uniform Resource Identifier (URI): Generic Syntax, memo retrieved from http://tools.ietf.org/html/rfc3986 on Mar. 27, 2012, 62 pages.

* cited by examiner

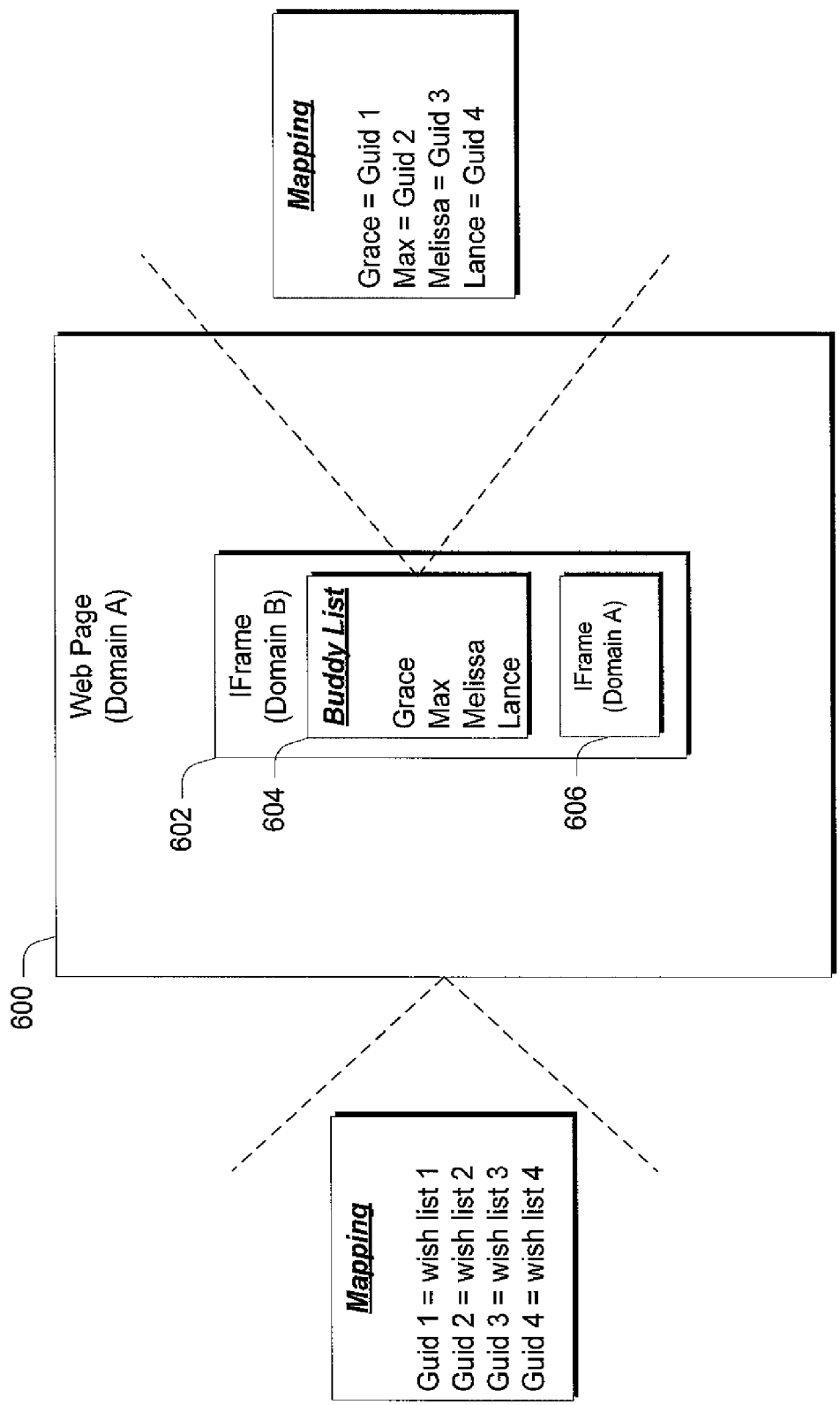

CROSS DOMAIN COMMUNICATION

BACKGROUND

Today, many browsers are designed to disallow what is known as cross site scripting. That is, web pages are associated with domains. If a web page from a one domain attempts to communicate or execute a script on a web page from a different domain, many web browsers will disallow the communication or script execution. There are various reasons why this is done, many of which pertain to security.

Notwithstanding the concerns associated with security and which have driven, to a certain extent, the restrictions on cross site scripting, there is value that can arise by allowing communication across different domains.

SUMMARY

Various embodiments utilize nested Iframes within a web page to allow cross domain communication. That is, various embodiments can create an is embedded Iframe that shares the domain of an Iframe or web page with which communication is desired. Because the embedded Iframe shares the domain of the Iframe or web page with which communication is desired, restrictions on cross-site scripting do not inhibit communication or scripting between the domain-matched Iframe(s) and/or web page. This embedded Iframe can then provide a mechanism by which web pages or Iframes from other domains can communicate with the Iframe or web page with which the embedded Iframe shares a domain.

The inventive approach can be utilized in the context of sending insecure and secure messages. Further, in at least some embodiments, reliability can be enhanced by providing a reliability mechanism that can be used to track and confirm messages that are sent back and forth between the domain-matched Iframe and web page.

BRIEF DESCRIPTION OF THE DRAWINGS

FIG. 7 illustrates the FIG. 6 web page and Iframes in accordance with one embodiment.

DETAILED DESCRIPTION

Overview

Figure 1:
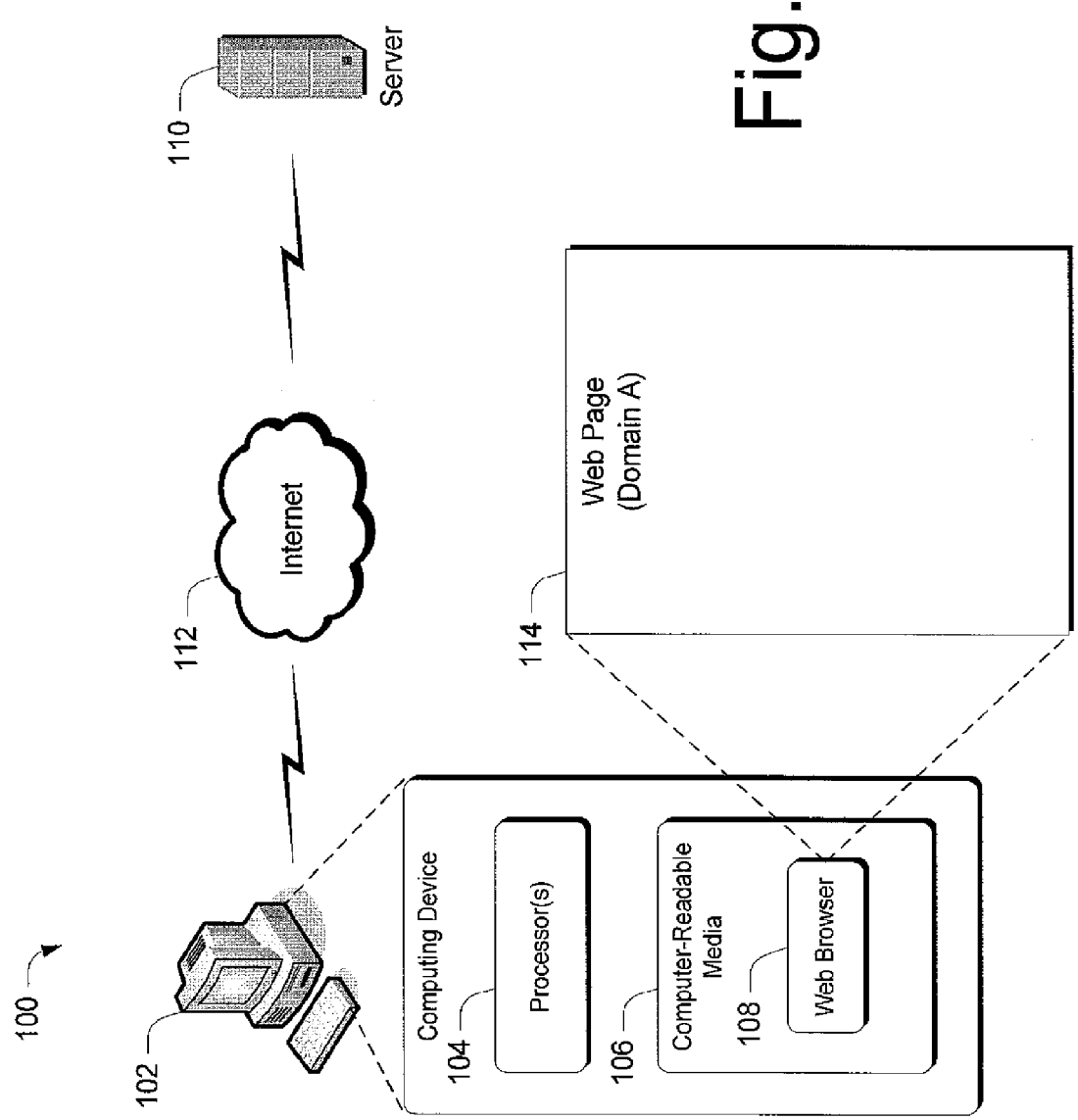
FIG. 1 illustrates an exemplary environment, in accordance with one embodiment, in which the inventive embodiments can be employed.

Various embodiments utilize nested Iframes within a web page to allow cross domain communication. That is, various embodiments can create an embedded Iframe that shares the domain of an Iframe or web page with which communication is desired. Because the embedded Iframe shares the domain of the Iframe or web page with which communication is desired, restrictions on cross-site scripting do not inhibit communication or scripting between the domain-matched Iframe(s) and/or web page. This embedded Iframe can then provide a mechanism by which web pages or Iframes from other domains can communicate with the Iframe or web page with which the embedded Iframe shares a domain.

The inventive approach can be utilized in the context of sending insecure and secure messages. Further, in at least some embodiments, reliability can be enhanced by providing a reliability mechanism that can be used to track and confirm messages that are sent back and forth between the domain-matched Iframe and web page.

Iframes and the manner in which Iframes work will be appreciated by the skilled artisan and, as such, are not described in great detail here. However, for some basic context on Iframes, consider the following.

An Iframe is a construct which embeds a document, such as a web page, into an HTML document. Traditionally, Iframes have been used so that embedded data can be displayed inside a subwindow of the browser's window. This does not mean full inclusion; the two documents are independent, and both them are treated as complete documents, instead of treating one as part of the other.

Basically, an iframe element is of the form;

```
<iframe src="URL" more attributes>
</iframe>
```

Browsers which support Iframes display or load the document referred to by the URL in a subwindow, typically with vertical and/or horizontal scroll bars; such browsers ignore the content of the iframe element (i.e. everything between the start tag <iframe . . . > and the end tag </iframe>).

In the discussion that follows, Iframe are re-purposed, in a sense, to enable cross domain communication.

In the discussion below, the following primary sections are provided. First, a section entitled "Exemplary Environment" is provided and describes but one example of an environment in which the inventive embodiments can be employed. Following this, a section entitled "Establishing A Cross Domain Message Delivery System" is provided and describes how a cross domain message delivery system can be created in accordance with one embodiment. Next, a section entitled "Using the Cross Domain Message Delivery System" is provided and describes how one can use the cross domain message delivery system in accordance with one embodiment. Following this, a section entitled "Reliable Messaging" is provided and describes one embodiment in which a degree of reliability can be added to the cross domain communication of messages. Finally, a section entitled "Using Cross Domain Communication to Facilitate Social Networking" is provided and describes but one example of how cross domain communication can be utilized.

Exemplary Environment

FIG. 1 illustrates an exemplary environment, in accordance with one embodiment, in which the inventive embodiments can be employed generally at 100.

Here, system 100 includes a client computing device 102 which includes one or more processors 104 and one or more computer-readable media 106 on which executable, computer-readable instructions reside. In this example, computer-readable media 106 includes instructions in the form of code that implements one or more applications such as web browser 108. The various embodiments described below can be implemented in connection with any suitable type of application.

Web browser 108 is configured to communicate with one or more servers 110 via a network such as the Internet 112. In practice, browser 108 can receive web content from server 110 and render such content for a user in the form of a web page, an example of which is shown at 114. In the examples below, browser 108 can be used to render Iframes within a web page to create a cross domain message delivery system that can permit cross domain communication, as will become apparent.

It is to be appreciated and understood that while computing device 102 is illustrated as a desk top computing device, other computing devices such as laptop devices, notebook devices, handheld devices and the like can be utilized without departing from the spirit and scope of the claimed embodiments.

Establishing a Cross Domain Message Delivery System

Figure 2:
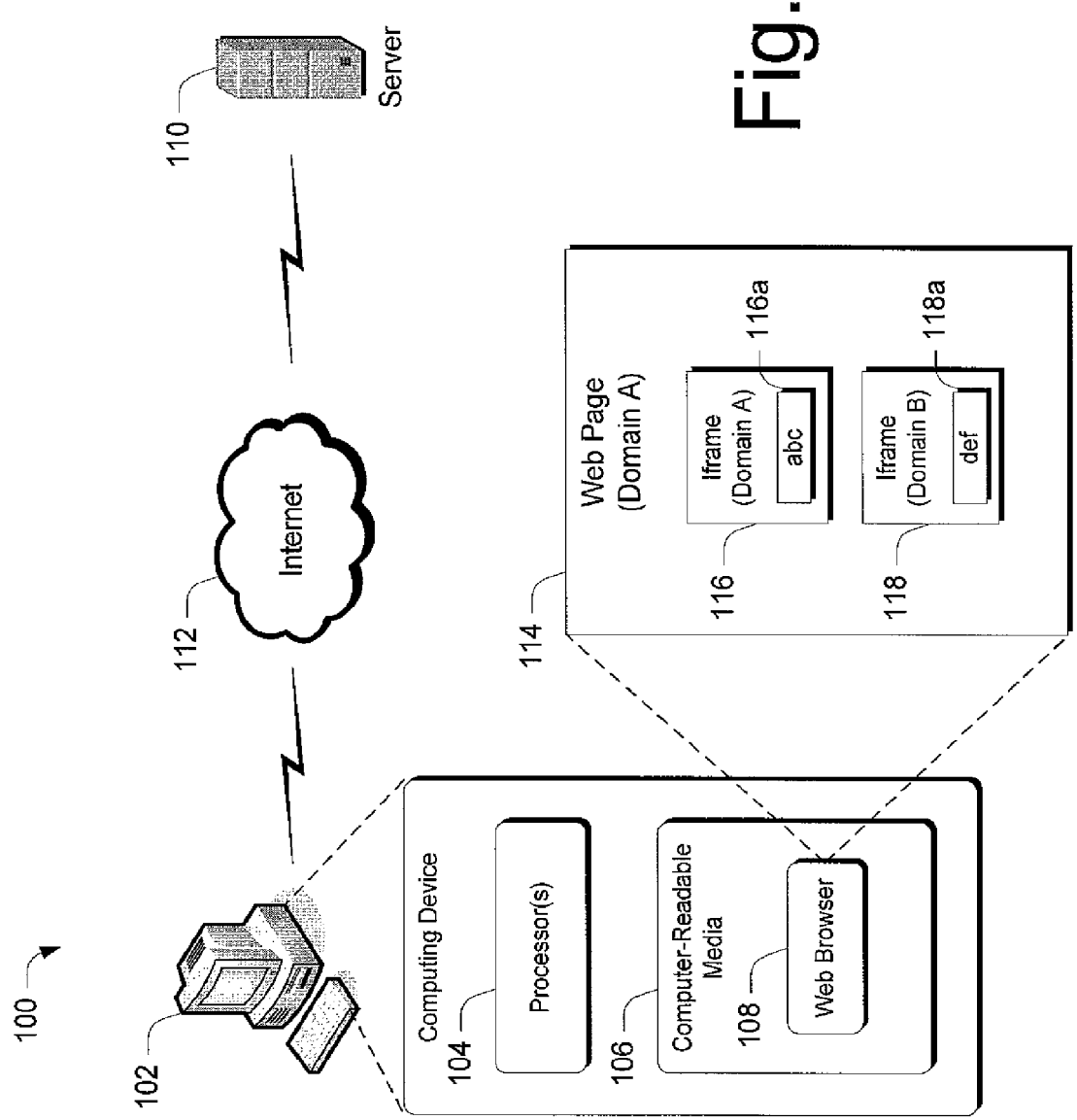
FIG. 2 illustrates the system of FIG. 1 in which a cross domain message delivery system has been created in accordance with one embodiment.

FIG. 2 illustrates the system of FIG. 1 in which a cross domain message delivery system has been created in accordance with one embodiment. In this particular example, web page 114 includes two different Iframes that have been created—Iframe 116 and Iframe 118. It is possible for the web page to include only one Iframe and for the cross domain communication techniques to be implemented using that one Iframe. However, for this example, Iframes 116 and 118 are used.

Web page 114 is said to be a "containing page" because it contains the two created Iframes. In this example, web page 114 has been created in a first domain—domain A. Notice here that Iframe 116 has been created in domain A and Iframe 118 has been created in domain B. Each of Iframes 116 and 118 includes or contains, in this example, a listener Iframe that shares its Iframe's domain. Hence, Iframe 116 contains listener Iframe 116a and Iframe 118 contains listener Iframe 118a. Iframes 116 and 118 can be considered as "containing frames" because they contain other Iframes. The listener Iframes 116a, 118a can be considered as embedded or nested Iframes that serve as target windows for cross domain communication that takes place, as will become apparent below.

In accordance with one embodiment, the cross domain message delivery system can be created as follows.

When the containing page—here page 114—loads, it creates Iframe 116 in its own domain and passes into the Iframe a name that is to be used for a corresponding listener Iframe. Although any suitable name can be used, in this example the name comprises a private hash which, in the illustrated example, is represented as "abc". Iframe 116 then creates the listener or nested Iframe 116a in its domain using the private hash as its name. Nested Iframe 116a is associated with an URL that is used for cross domain communication and is the message receiver or target window for messages intended for containing page 114.

In addition, containing page 114 can also create Iframe 118 in a different domain—domain B—and pass in a name that is to be used for a corresponding listener Iframe. Although any suitable name can be used, in this example the name comprises a private hash which, in the illustrated example, is represented as "def". Iframe 118 then creates the listener or nested Iframe 118a in its domain using the private hash as its name. Nested Iframe 118a is associated with an URL that is used for cross domain communication and serves as the message receiver or target window for messages intended for the containing Iframe 118.

In this example, if communication is to take place between Iframes 116 and 118, each is provided with the name of the listener Iframe for the other. So, for example, Iframe 116 is provided with the name "def" and Iframe 118 is provided with the name "abc". This can typically take place when the Iframe is initially created in the containing page 114.

Figure 3:
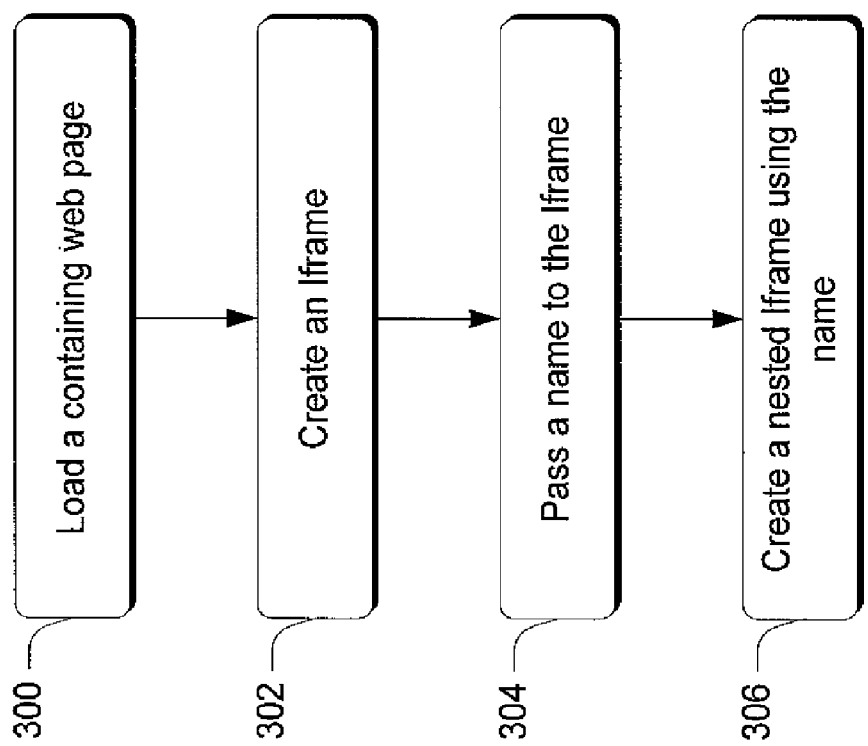
FIG. 3 is a flow diagram that describes a process for creating a cross domain message system in accordance with one embodiment.

FIG. 3 is a flow diagram that describes a process for creating a cross domain message system in accordance with one embodiment. The method can be implemented in connection with any suitable hardware, software, firmware or combination thereof. In but one embodiment, the method can be implemented in software in the form of a web browser.

Step 300 loads a containing web page and step 302 creates an Iframe that is contained within the web page. Step 302 can be performed multiple different times to create multiple different Iframes in the same and/or different domains from that of the containing web page. Step 304 passes a name to the Iframe. This step can be performed multiple different times as well and can be performed as part of the process of creating the Iframe. The name is to be used in connection with a nested listener Iframe that is to be created. Step 306 creates a nested Iframe using the name that was passed to the Iframe. This step can be performed multiple different times and can be performed by a corresponding Iframe that was created.

At this point, a cross domain message system, such as that illustrated in FIG. 2 has been created and can be used to message across different domains.

Using the Cross Domain Message Delivery System

In accordance with one embodiment, when a web page from a different domain wishes to communicate with a particular Iframe, it manipulates an URL associated with the Iframe's listener Iframe and includes, in the URL, the message that is desired to be communicated to the Iframe. In this particular example, cross domain communication can take place in connection with a server. This can permit a degree of security that is provided by the server. That is, the server can process the cross domain messages in many different ways such as by validating the messages, verifying the sender and the like.

For example, in the example of FIG. 2, assume that web page 114 wishes to communicate with Iframe 118. To do so, web page 114 might initiate a server call to open a window or load a page in the listener Iframe for Iframe 118 as follows:

window.open(http://Domain_B/secure_msg.aspx?[message] def)

This call opens a window in the B domain, and it calls a secure message page "secure_msg.aspx" to implement some type of security procedure. After this portion of the URL, the message that is intended to be sent, i.e. "[message]" is appended, as is the name of the window to which the message is targeted—here, "def".

Assuming that any security issues pertaining to the message are resolved favorably, the server then causes the message to load in the nested Iframe 118a which is in Iframe 118's domain. Nested Iframe 118a can then notify its parent or containing Iframe that it has a message. Iframe 118 can then process the message accordingly, as by executing scripts using the message.

To respond, Iframe 118 would simply issue a call to open a window or load a page in the listener Iframe 116a for Iframe 116. This call, routed through the server, would then cause a window to be opened or a page which contains the message to be loaded in listener Iframe 116a.

Figure 4:
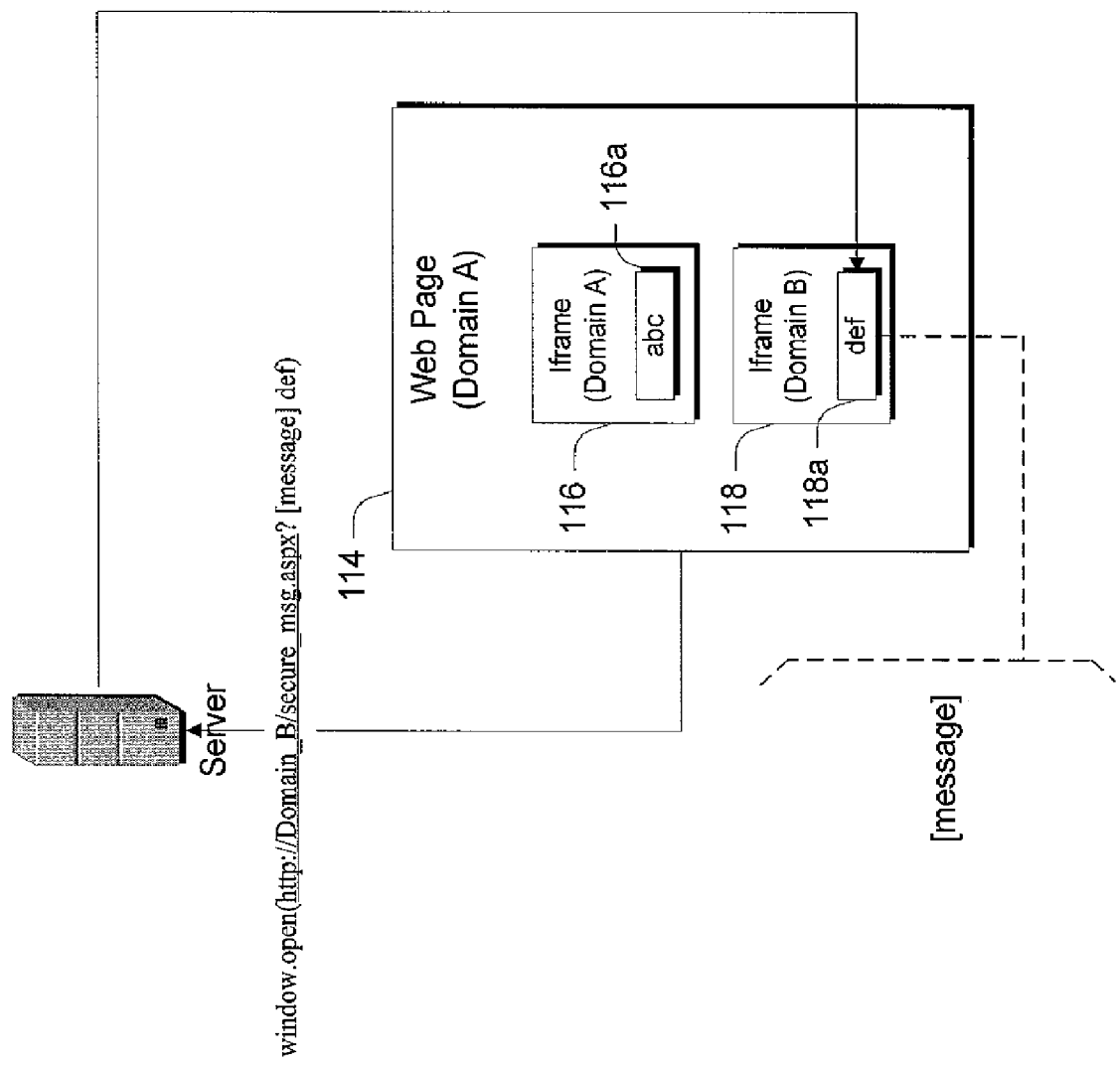
FIG. 4 illustrates cross domain communication in accordance with one embodiment.

This process is diagrammatically shown in FIG. 4. Here, web page 114 initiates a call to open a window in the listener Iframe for Iframe 118. The call, which includes the message that is to be communicated across different domains, is routed through the server and the server then causes a corresponding window or page to be loaded in the listener Iframe 118a for Iframe 118. This page includes the message from web page 114.

Hence, using this approach can allow messages and other information to be communicated across different domains.

Figure 5:
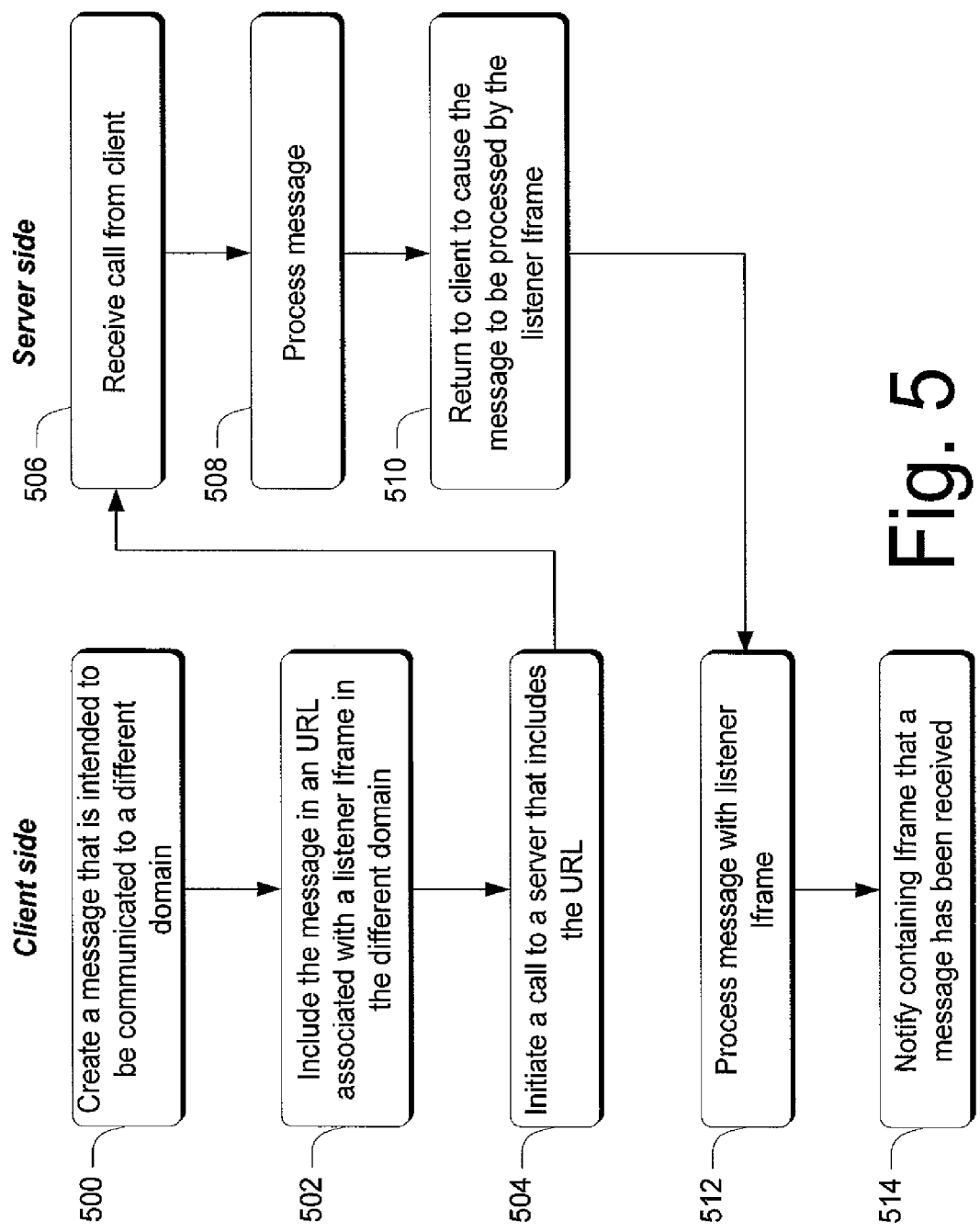
FIG. 5 is a flow diagram that describes a process for using a cross domain message system in accordance with one embodiment.

FIG. 5 is a flow diagram that describes a process for using a cross domain message system in accordance with one embodiment. The method can be implemented in connection with any suitable hardware, software, firmware or combination thereof. In but one embodiment, the method can be implemented in software. In the explanation that follows, acts or steps that are performed on the client side are designated as such. Likewise, acts or steps that are performed on the server side are designated as such.

Step 500 creates a message that is intended to be communicated to a different domain. Any suitable type of message can be created. For example, one message might be a refresh message that causes another document to refresh (e.g., a stock list component can be notified to refresh stock quotes. Other messages can present ambient properties pertaining to the mode of a page such as "author" versus "view" mode, or share stylistic information (e.g., a stock quote component can switch to allow new stocks to be added, or a particular theme can be shared with the component. Further, some messages can request metadata (e.g. a list of contacts, books and the like can be requested and returned to the other page).

Step 502 includes the message in an URL associated with a listener Iframe in the different domain. One example of how this can be done is provided above. Step 504 initiates a call to a server that includes the URL. One example of how this can be done is provided above.

Step 506 receives the call from the client at the server and step 508 processes the message. Any suitable processing can take place. In the example above, the processing that takes place pertains to security. Other types of processing can take place. Step 510 returns to the client to cause the message to be processed by the listener Iframe.

Step 512 processes the message with the listener Iframe and step 514 notifies the containing Iframe that a message has been received. This step is performed by the listener Iframe.

In the embodiment described just above, a server is utilized to facilitate cross domain message delivery. Incorporating a server into the process can enable the message processing to be augmented in some way, such as by providing server-enhanced security processes. It is possible, however, for cross domain message delivery to take place in a purely client side manner without round tripping to the server.

In this embodiment, cross domain messages are sent by manipulating the URL of the Iframe that is contained with a web page. As an example, consider the following. Each individual Iframe in a web page is associated with an URL. An URL typically has the following form:

scheme://authority/path?query#fragment

The authority typically consists of the name or IP address of a server, optionally followed by a colon and a TCP port number. It may also contain a username and password for authenticating to the server. The path is a specification of a location in some hierarchical structure, using a slash ("/") as delimiter between components. The query typically expresses parameters of a dynamic query to some database, program, or script residing on the server. The fragment occurs after the hash "#" and identifies a portion of a resource, often a location in a document. Fragments or hashes are interpreted on the client side and are not typically used by the server.

In accordance with this embodiment, when a containing page from a different domain wishes to communicate or send a message to an Iframe in another domain, it appends the message to the appropriate Iframe's URL after the hash. Thus, a message to an Iframe from another domain would take the following form:

scheme://authority/path?query#[message]

when the Iframe detects the URL change, it can parse the URL to access the message and can then process the message accordingly. If the Iframe wishes to communicate back to the containing page or another listener, it uses a similar approach—that is, it manipulates the URL of the intended recipient to append the message after the hash in the recipient's URL. If the intended recipient is a listener Iframe for the containing page, then the listener Iframe can receive the message and because it shares the domain of the containing page, it can call functions in the containing page—such as a notification function to notify the containing page that it has received a new message.

In this embodiment, all of the message sending and receiving can take place without round tripping to the server. Thus, server resources can be conserved.

Reliable Messaging

In at least some embodiments, message reliability can be enhanced by adding a unique message counter associated with each message that is sent from a particular domain. For example, in some instances, a particular Iframe may be the subject of a number of incoming messages. Yet, if these messages arrive at the same time, there is a chance that at least some of the messages will be missed. In this case, each message from a particular domain is associated with a unique, incremental ID that is incremented for each new message from that domain. When the Iframe receives a particular message from a particular domain, if the message counter is off by one or more increments, then the Iframe knows to request the missing messages from the sender. The message counter can be implemented as a field in the URL associated with the targeted recipient of the message.

Alternately or additionally, reliable messaging can be enhanced by having individual Iframes communicate back acknowledgements to the message originator that a particular message has been received. The message originator can also, if so desired, query the recipient to ascertain whether the recipient received the message.

Other Extensions

Using the above-described approach, a containing web page can also act as an intermediary between Iframes from different domains or allow the frames to communicate directly by giving each the name of the target window in the other. One of the things that this can enable is remote procedure calls or RPC. That is, a message schema can be utilized that allows messages to be defined for invoking methods or operations in other domains. In this way, a distributed RPC-like mechanism is provided for executing actions in other domains.

Using Cross Domain Communication to Facilitate Social Networking

There are instances when it would be desirable to enable a third party web site to utilize aspects of a user's relationships with others to provide the user a rich experience. For example, a user may have a large "buddy list" as part of their instant messaging application. Some third party web site might have applications that could provide the user with a rich and robust experience if it only had access to the buddy list. For example, a third party web site might be able to show you all of your buddies' wish lists. Yet, for purposes of privacy, it is not desirable to provide the third party web site with access to the user's buddy list.

In the embodiment described below, nested Iframes are utilized to provide a rich and robust experience in which relationship information can be shared, yet protected.

Figure 6:
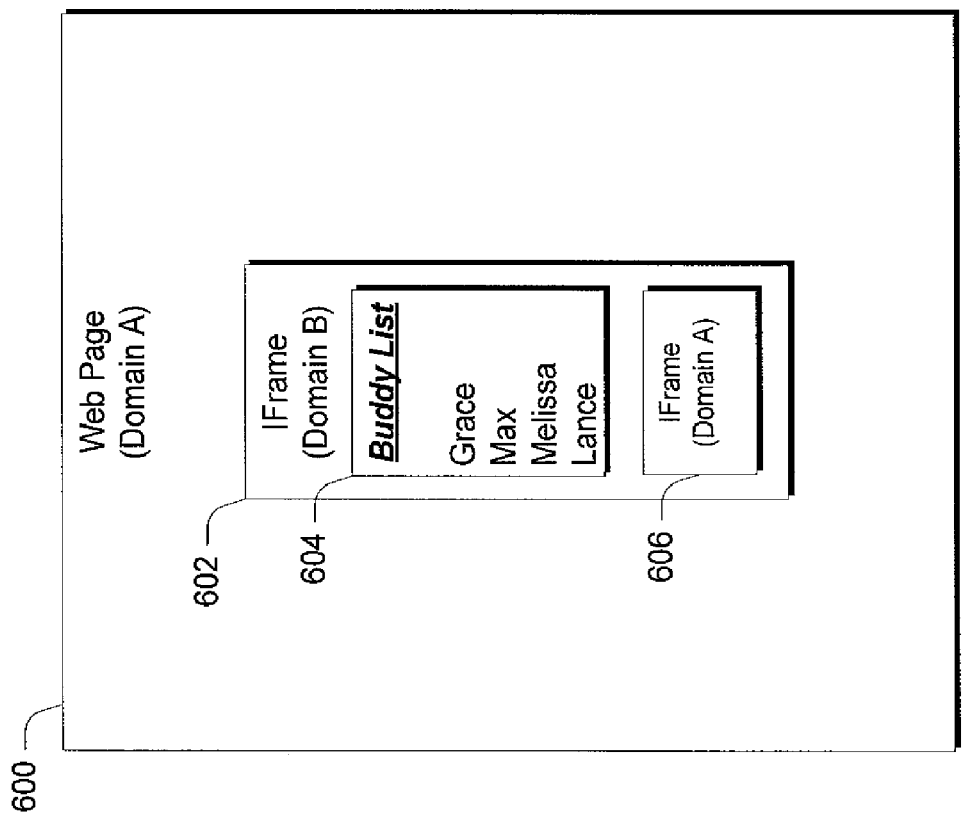
FIG. 6 illustrates a web page and Iframes in accordance with one embodiment.

As an example, consider FIG. 6. There, a web page or containing page 600 created in domain A includes an Iframe 602 created in domain B, a buddy list 604 that has been rendered in domain B, and an Iframe 606 in domain A that is contained within Iframe 602. Because of restrictions on cross site scripting, neither web page 600 nor Iframe 606 can access the buddy list that resides in domain B. Yet, there are circumstances when it might be desirable to allow web page 600 to use relationship information associated with buddy list 604 while, at the same time, allow cross site scripting restrictions to disallow access to the buddy list.

That is, in this instance, we would like to have the ability to send information associated with Iframe 602 to web page 600. In accordance with one embodiment, when web page 600 loads, it creates Iframe 602 and provides it with a postback URL that can be used to communicate with web page 600. When Iframe 602 creates nested Iframe 606 (in the same domain as web page 600), it provides the nested Iframe with information on the postback URL. Since Iframe 606 and web page 600 are in the same domain, there are no cross site scripting restrictions that would prevent them from communicating. The web page 600 and Iframe 606 can now communicate using, for example, jscript.

Consider now FIG. 7 in conjunction with the following example. Assume that web page 600 is associated with a large on-line retailer that sells books, music CDs and the like. Assume also that a user has browsed to the page and responsively, Iframe 602 has loaded their buddy list. Assume also that web page 600 asks the user if they would like to view wish lists for any of their buddies. Assume now that the user clicks on one of their buddies. In this embodiment, each buddy is mappable to a unique ID or Guid. Because of cross-site scripting restrictions, this mapping is available within domain B but not domain A. The Guid for the user's particular friend is retrieved and rendered as a web page inside Iframe 606 using, for example, techniques described above. Now, using the Guid that was just rendered, Iframe 606 uses the web page's post back URL (or some other form of communication) to provide the Guid to web page 600. Having the Guid, web page 600 has access to a mapping of Guids to wish lists. Hence, the web page can now render the particular buddy's wish list for the user, without having access to the buddy's identity or any other of the buddy's information.

In this way, third party web sites can access and leverage relationship information associated with a particular user, while at the same time such relationship information is protected.

CONCLUSION

Various embodiments utilize nested Iframes within a web page to allow cross domain communication. That is, various embodiments can create an embedded Iframe that shares the domain of an Iframe or web page with which communication is desired. Because the embedded Iframe shares the domain of the Iframe or web page with which communication is desired, restrictions on cross-site scripting do not inhibit communication or scripting between the domain-matched Iframe(s) and/or web page. This embedded Iframe can then provide a mechanism by which web pages or Iframes from other domains can communicate with the Iframe or web page with which the embedded Iframe shares a domain.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
   creating a message in an Iframe in a first domain for communication to a second domain, the act of creating being performed by a web page that includes an associated listener Iframe in the first domain that is configured to receive messages from the second domain;
   using the associated listener Iframe as a target window for cross domain communication between the first and second domains, the cross domain communicating being performed without round tripping to a server and comprising:
   communicating, using a post back URL, relationship information associated with a user between the first and second domains such that the relationship information associated with the user remains protected;
   manipulating a URL associated with the Iframe, wherein the manipulating comprises:
   appending the created message to a URL of the form: scheme://authority/path?query#[message], such that:
      the authority comprises a name or IP address;
      the path specifies a location in some hierarchical structure;
      the query expresses parameters of a dynamic query to a database, program or script; and
      a fragment occurring after the hash ("#") identifies a portion of a resource;
   detecting a change in the URL at the Iframe and parsing the URL to access the message; and
   associating a unique, incremental ID for each new message from a specific URL;
   using a message counter implemented as a field in a URL associated with a target recipient of the message to ensure that messages that are communicated between the different domains are not missed, wherein if the message counter is off by one or more increments, requesting a missing message from a sender; and
   processing the message.

2. The method of claim 1, wherein the web page and the Iframe are created in different domains and wherein the act of using the associated listener Iframe comprises manipulating an URL associated with the Iframe.

3. The method of claim 1, wherein the relationship information pertains to a buddy list.

4. The method of claim 1, additionally comprising:
   interpreting the fragment on the client side and not using the fragment on the server.

5. The method of claim 1, additionally comprising:
   following the authority with a colon and a TCP port number; and
   including in the authority a username and password for authenticating the server.

6. A software-implemented method comprising:
   creating a message in an Iframe in a first domain for communication to a second domain, the act of creating being performed by a web page that includes an associated listener Iframe in the first domain that is configured to receive messages from the second domain;
   using the associated listener Iframe as a target window for cross domain communication between the first and second domains, the cross domain communicating being performed without round tripping to a server and comprising:
communicating, using a post back URL, relationship information associated with a user between the first and second domains such that the relationship information associated with the user remains protected;
manipulating a URL associated with the Iframe, wherein the manipulating comprises:
appending the created message to a URL of the form:
scheme://authority/path?query#[message], such that:
the authority comprises a name or IP address;
the path specifies a location in some hierarchical structure;
the query expresses parameters of a dynamic query to a database, program or script; and
a fragment occurring after the hash ("#") identifies a portion of a resource;
detecting a change in the URL at the Iframe and parsing the URL to access the message; and
associating a unique, incremental ID for each new message from a specific URL;
using a message counter implemented as a field in a URL associated with a target recipient of the message to ensure that messages that are communicated between the different domains are not missed, wherein if the message counter is off by one or more increments, requesting a missing message from a sender; and
processing the message.

7. The method of claim 6, wherein the web page and the Iframe are created in different domains and wherein the act of using comprises manipulating an URL associated with the Iframe.

8. The method of claim 6, wherein the relationship information comprises a buddy list.

9. The method of claim 6, additionally comprising:
interpreting the fragments and hashes on the client side and not using the fragments and hashes on the server.

10. The method of claim 6, additionally comprising:
following the authority with a colon and a TCP port number; and
including in the authority a username and password for authenticating the server.

11. A browser-implemented method comprising:
creating a message in an Iframe in a first domain for communication to a second domain, the act of creating being performed by a web page that includes an associated listener Iframe in the first domain that is configured to receive messages from the second domain;
using the associated listener Iframe as a target window for cross domain communication between the first and second domains, the cross domain communicating being performed without round tripping to a server and comprising:
communicating, using a post back URL, relationship information associated with a user between the first and second domains such that the relationship information associated with the user remains protected;
manipulating a URL associated with the Iframe, wherein the manipulating comprises:
appending the created message to a URL of the form:
scheme://authority/path?query#[message], such that:
the authority comprises a name or IP address;
the path specifies a location in some hierarchical structure;
the query expresses parameters of a dynamic query to a database, program or script; and
a fragment occurring after the hash ("#") identifies a portion of a resource;
detecting a change in the URL at the Iframe and parsing the URL to access the message; and
associating a unique, incremental ID for each new message from a specific URL;
using a message counter implemented as a field in a URL associated with a target recipient of the message to ensure that messages that are communicated between the different domains are not missed, wherein if the message counter is off by one or more increments, requesting a missing message from a sender; and
processing the message.

12. The method of claim 11, wherein the web page and the Iframe are created in different domains and wherein the act of using comprises manipulating an URL associated with the Iframe.

13. The method of claim 11, wherein the relationship information comprises a buddy list.

14. The method of claim 11, additionally comprising:
interpreting the fragments and hashes on the client side and not using the fragments and hashes on the server.

15. The method of claim 11, additionally comprising:
following the authority with a colon and a TCP port number; and
including in the authority a username and password for authenticating the server.

* * * * *